(12) United States Patent
Watanabe et al.

(10) Patent No.: US 7,965,334 B2
(45) Date of Patent: Jun. 21, 2011

(54) AUTO-FOCUS CAMERA WITH ADJUSTABLE LENS MOVEMENT PITCH

(75) Inventors: Toshimi Watanabe, Yokohama (JP);
Toshiaki Maeda, Yokohama (JP);
Tadashi Ohta, Yokohama (JP)

(73) Assignee: Nikon Corporation, Tokyo (JP)

( * ) Notice: Subject to any disclaimer, the term of this patent is extended or adjusted under 35 U.S.C. 154(b) by 268 days.

(21) Appl. No.: 11/819,099

(22) Filed: Jun. 25, 2007

(65) Prior Publication Data

US 2007/0247542 A1    Oct. 25, 2007

Related U.S. Application Data

(63) Continuation of application No. 10/392,988, filed on Mar. 21, 2003, now abandoned.

(30) Foreign Application Priority Data

Apr. 17, 2002    (JP) .................................. 2002-114831

(51) Int. Cl.
*H04N 5/232*    (2006.01)
*G03B 13/00*    (2006.01)

(52) U.S. Cl. ........................................ 348/347; 348/345

(58) Field of Classification Search .................. 348/345, 348/347–349, 353–354, 356–357
See application file for complete search history.

(56) References Cited

U.S. PATENT DOCUMENTS

| 5,687,402 | A  |   | 11/1997 | Kishimoto et al. |   |
|---|---|---|---|---|---|
| 6,449,013 | B1 |   | 9/2002 | Suzuki et al. |   |
| 6,473,126 | B1 | * | 10/2002 | Higashihara et al. | 348/345 |
| 6,496,225 | B1 | * | 12/2002 | Higashihara et al. | 348/345 |
| 6,876,391 | B1 |   | 4/2005 | Hashimoto |   |
| 2001/0035910 | A1 |   | 11/2001 | Yukawa et al. |   |

FOREIGN PATENT DOCUMENTS

| JP | A-06-062301 | 3/1994 |
|---|---|---|
| JP | A-07-199039 | 8/1995 |
| JP | A-09-184964 | 7/1997 |
| JP | A-2000-292683 | 10/2000 |
| JP | A-2001-281533 | 10/2001 |
| JP | A-2001-330882 | 11/2001 |
| JP | A-2001-343581 | 12/2001 |
| JP | A-2002-214517 | 7/2002 |

* cited by examiner

*Primary Examiner* — Kelly L Jerabek
(74) *Attorney, Agent, or Firm* — Oliff & Berridge, PLC

(57) ABSTRACT

An auto-focus (AF) camera enables AF operation with high speed and enhanced accuracy. The AF operation encompasses step-scanning the focus lens of the camera from the closest focal position to infinity, or vice versa. In one embodiment, the steps in the step-scanning are made smaller around a position judged to be close to the focus position, and the steps are made larger at other positions.

18 Claims, 5 Drawing Sheets

AUTO-FOCUS CAMERA WITH ADJUSTABLE LENS MOVEMENT PITCH

This is a Continuation of application Ser. No. 10/392,988 filed Mar. 21, 2003. The disclosure of the prior application is hereby incorporated by reference herein in its entirety.

INCORPORATION BY REFERENCE

This application is based upon and claims priority of Japanese Patent Application No. 2002-114831 filed on Apr. 17, 2002, the contents being incorporated herein by reference.

BACKGROUND OF THE INVENTION

1. Field of the Invention

The present invention relates to a camera capable of automatic focusing (AF) by a contrast method.

2. Description of Related Art

In this field of the art, as one of ways of automatic focus (AF) adjustment for use in a camera, there is a so-called contrast method. According to this method, an object is picked up by an imaging element such as CCD or so and an in-focus position is determined by using an imaging signal in a focus detection area. More specifically, a component of a given spatial frequency band is extracted from an imaging signal within a given focus detection area by a band pass filter and by integrating a component's absolute value, focus evaluation value is calculated. This focus evaluation value is an amount that corresponds to a contrast of a focus detection area and the higher a contrast is, the higher the value is. In view of the fact that the closer a focus lens is to an in-focus position, the higher a contrast of an object becomes, detects a position showing a peak value of focus evaluation value is detected and judged to be an in-focus position and then a focusing optical system is driven to the in-focus position.

As one of ways to detect a peak value position, a focus lens is driven to scan from a point at infinity away to a point at a closest distance away or vice-versa and while scanning, every time a focus lens moves by a given movement pitch, each focus evaluation value is calculated respectively and each calculated value is also memorized respectively and then, by evaluating a plurality of memorized each focus evaluation value, a peak value position is obtained (a scan method).

SUMMARY OF THE INVENTION

In a scan method, a fine scan by making a movement pitch of a focus lens small enables to detect a peak value position (an in-focus position) with high accuracy. However, a fine scanning inevitably invites an increase in the number of calculations of focus evaluation values, which would take much time to scan and lead to a decrease in AF speed.

It is an object of this invention to provide a camera enabling to become compatible with an enhanced accuracy and a high speed in an AF operation.

In order to achieve the object, according to claim 1 set forth in this invention, there is provided a camera which includes an imaging element that receives transmitted light of an imaging optical system including a focus lens, a calculator that calculates focus evaluation value varying in response to a status of a focusing adjustment of the focus lens based upon an output of photoelectric conversion of the imaging element, a scan driving that scans the focus lens in a single direction along an optical axis in obtaining a focus point, a detector that detects an absolute position of the focus lens, a pitch determiner that determines a lens movement pitch deciding timing to obtain the focus evaluation value at a given interval in response to a detection output of the detector during the scan driving, a controller that obtains the focus evaluation value by activating the calculator every time the focus lens moves by the determined lens movement pitch during the scan driving and a focusing adjuster that seeks a focus point by evaluating a plurality of focus evaluation values obtained by the controller and drives the focus lens to the focus point.

According to claim 2 set forth in this invention, there is provided the camera disclosed in claim 1, wherein, in a case of the lens position detected by the detector being included in a given range, the pitch determiner makes the movement pitch small as compared to a case of the lens position being included in another range other than the given range. According to claim 3 set forth in this invention, there is provided the camera disclosed in claim 2, wherein the given range is narrow in comparison to another range other than the given range.

According to claim 4 set forth in this invention, there is provided the camera disclosed in claim 2, wherein the given range is adjacent to a start or a finish point of the scan driving.

According to claim 5 set forth in this invention, there is provided the camera disclosed in claim 2, wherein the pitch determiner determines the movement pitch in response to the output of the detector and a focal length of the imaging optical system and the longer the focal length is, the smaller the movement pitch is made.

According to claim 6 set forth in this invention, there is provided the camera disclosed in claim 5, wherein the longer the focal length is, the narrower the given range is made.

According to claim 7 set forth in this invention, there is provided the camera disclosed in claim 2, wherein the pitch determiner determines the movement pitch in response to the output of the detector and f-number of the imaging optical system and the greater the f-number is, the larger the movement pitch is made.

According to claim 8 set forth in this invention, there is provided the camera disclosed in claim 7, wherein the greater the f-number is, the broader the given range is made.

According to claim 9 set forth in this invention, there is provided the camera disclosed in claim 1, wherein, in a case of the detected lens position being included in the given range, the pitch determiner makes the movement pitch large as compared to the case of the lens position being included in another range other than the given range.

According to claim 10 set forth in this invention, there is provided the camera disclosed in claim 1, wherein a close and long distance shooting modes are settable and in the close distance shooting mode, in a case of the detected lens position being included in a given range at a close distance away, the pitch determiner makes the movement pitch small as compared to a case of the detected lens position being included in another range other than the given range at a close distance away and in the long distance shooting mode, in a case of the detected lens position being included in a given range at a long distance away, the pitch determiner makes the movement pitch small as compared to a case of the detected lens position being included in another range other than the given range at a long distance away.

According to claim 11 set forth in this invention, there is provided the camera disclosed in claim 10, wherein the close distance mode includes a portrait and close-up shooting modes and the long distance mode includes a scenic and night scenery shooting modes.

According to claim 12 set forth in this invention, there is provided the camera disclosed in claim 10, wherein the scan driving scans the taking-lens from either infinity end or a closest distance end to the other end.

DETAILED DESCRIPTION OF THE PREFERRED EMBODIMENTS

Figure 1:
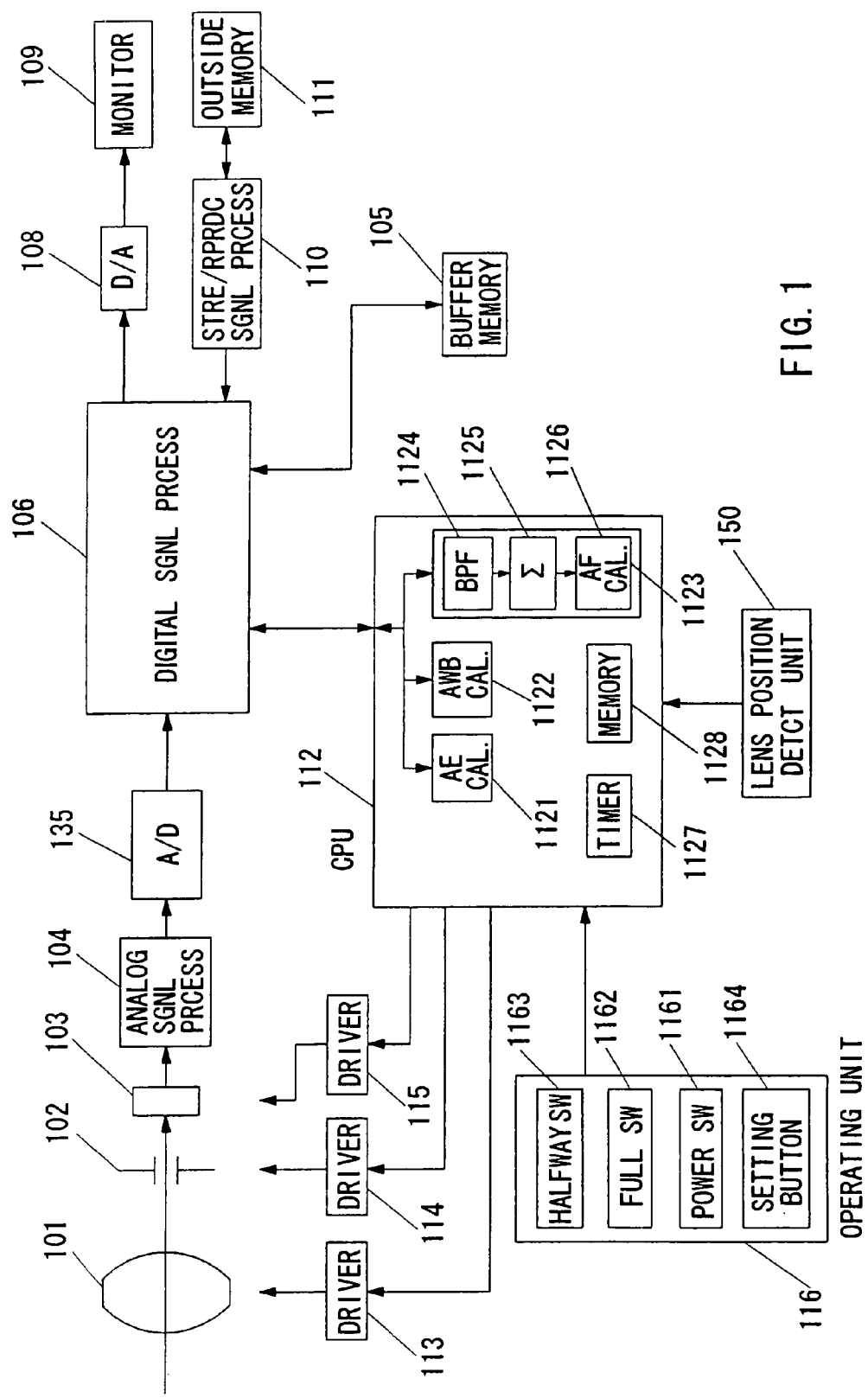
FIG. 1 is a block diagram showing a control system of a digital still camera of an embodiment in accordance with this invention.
Figure 2:
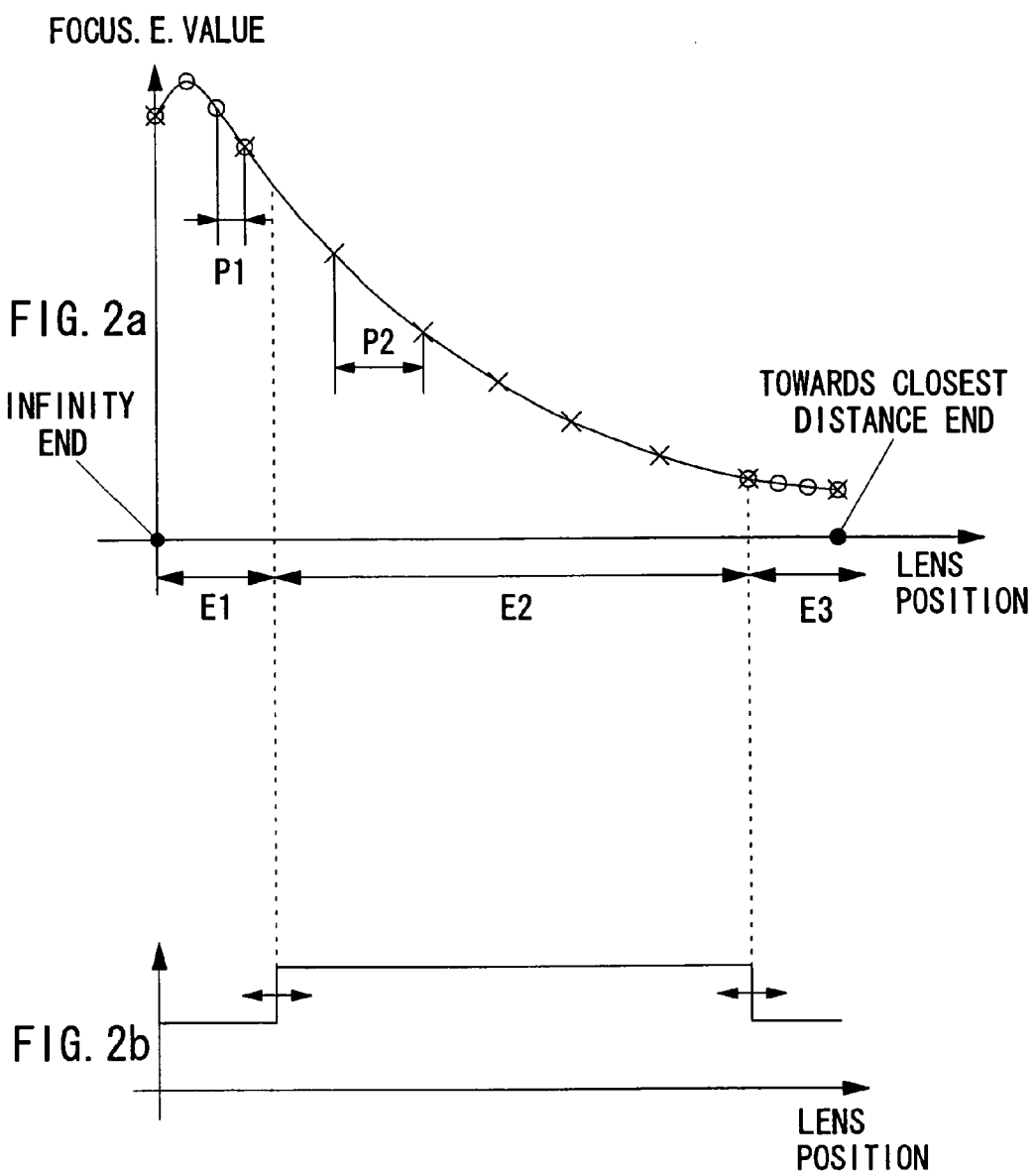
FIG. 2 is a diagram explaining a scanning control of a first embodiment in accordance with this invention.
Figure 3:
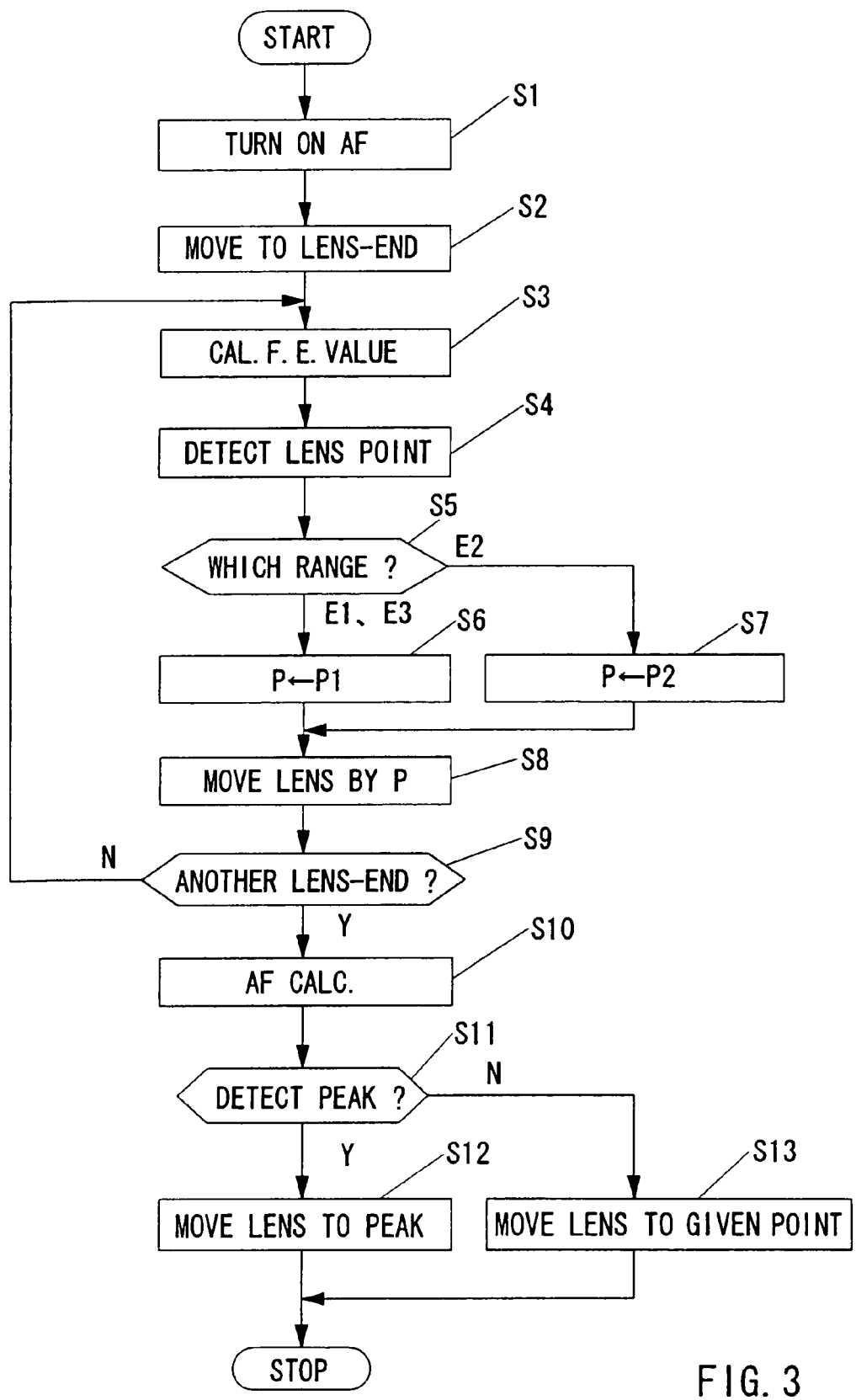
FIG. 3 is a flow chart illustrating an example of a processing procedure of a scanning control in FIG. 2.

A first embodiment of this invention is explained by referring to FIGS. 1~3.

FIG. 1 is a function block diagram of a digital still camera according to an embodiment of this invention. A flux of light of an object transmitted through imaging optical system 101 passes through diaphragm 102 and is formed on a light sensing plane of imaging element 103. Imaging element 103 is a photoelectric conversion imaging element which outputs an electric signal corresponding to a light intensity of an object image formed on a light sensing plane and as a photoelectric conversion imaging element, a solid-state imaging element such as CCD or MOS (Metal-Oxide Semiconductor) is used. An imaging signal that is an output of solid-state imaging element 103 is input into analog signal processing circuit 104 where a processing of a correlated dual sampling (CDS) and so are performed. Once an imaging signal processed by analog signal processing circuit 104 is converted into a digital signal, buffer memory 105 stores the digital signal temporarily. Buffer memory 105 is a frame memory capable of storing as many image data as plural frames. Data stored into buffer memory 105 is read out by digital signal processing circuit 106 where several image processing such as a contour compensation, gamma control and so on are performed. Digital signal processing circuit 106 includes a several signal processing circuits such as a gain control circuit, brightness signal creation circuit, color difference creation circuit and so which are controlled by CPU 112.

Once data digitally processed is stored again into buffer memory 105, the digital data is stored into outside storage medium 111 such as a memory card and like via record/reproduction signal processing circuit 110. In a case where an image data is stored in outside storage medium 111, an image data is generally compressed in a given compression method, for example, a JPEG method.

Record/reproduction signal processing circuit 110 is responsible for a processing of a data compression (ex. JPEG) when storing an image data into outside storage medium 111 and a data extension when reading out a compressed image data from outside storage medium 111.

An interface for use in a data communication with outside storage medium 111 is also included in record/reproduction signal processing circuit 110.

Monitor 109 is a liquid crystal display unit for use in showing a photographed image and also reproducing an image data stored into outside storage medium 111. In a case where an image is displayed on monitor 109, an image data stored into buffer memory 105 is read out and D/A converter 108 converts from a digital image data to an analog image data. Then, an image is displayed on monitor 109 with this analog image signal.

Displaying an object image picked up by imaging element 103 on monitor 109 takes two forms. One display form is such a case where a release operation is not performed and an object image being repeatedly picked up by imaging element 103 is successively displayed on a monitor by updating a picked-up object image, being called a through image. Another form is a so-called freeze image that displays an image picked up by imaging element 103 for a given period of time after releasing a camera shutter.

CPU 112 has AE calculation unit 1121 performing an automatic exposure calculation based upon an imaging signal from imaging element 103, AWB calculation unit 1122 calculating a coefficient of a white balance adjustment and a focus detection unit consisting of band pass filter (hereafter called BPS) 1124, evaluation value calculation unit 1125 and AF calculation unit 1126. BPF 1124 extracts a high-frequency component with a given frequency band from an imaging signal within a focus detection area provided in a taking-image area. In a case where a plurality of focus detection areas are provided, a signal per each focus detection area is read out in order and an extraction processing per each focus detection area is performed by BPS 1124. An example with one focus detection area will be explained below.

An output of BPS 1124 is input into evaluation value calculation unit 1125 and focus evaluation value is calculated by integrating an absolute value of a high-frequency component. AF calculation unit 1126 performs AF calculation based upon focus evaluation value and acknowledges an in-focus position. Details of AF calculation will be explained later. CPU 112 drives a stepping motor used for focusing (not shown here) via driver 113 based upon a calculation result output by AF calculation unit 1126 and moves a focus lens constituting imaging optical system 101 towards an in-focus position along an optical axis. Also, CPU 112 stores the foregoing focus evaluation value and a position of a focus lens at detecting focus evaluation value and is provided with storage unit 1128 for storing data for use in other calculations or so. Timer 1127 is generally called a halfway-depress timer and it starts counting when a halfway-depress operation of a release button is released and immediately after a first in-focus position is obtained after a power is turned on. Imaging optical system 101 includes also a zoom lens and driver 113 drives this zoom lens. Also, driver 114 drives diaphragm 102 in accordance with an instruction of CPU 112 and driver 115 controls timing to extract a signal from imaging element 103. Lens position detection unit 150 detects an absolute position of a focus lens and for instance, a known distance encoder provided on a lens barrel is used. Or, a lens position may be detected by counting a number of pulses of a stepping motor for focusing.

Operation unit 116 connected to CPU 112 includes power switch 1161 to turn on or off a camera, halfway-depress switch 1163 to switch on by halfway depressing a release button, full-depress switch 1162 to turn on by fully depressing a release button and setting button 1164 for selecting a shooting mode and the like. There are a normal, a scenic, a portrait, a sports, a close-up and a night scenery modes as a shooting mode set by setting button 1164 and a way of determining an exposure value is different according to each shooting mode. CPU 112 sets any of shooting modes in response to an operation of setting button 1164.

Next, a contrast AF control according to this embodiment is detailed. A contrast method pays attention to a correlation between a degree of an image blur and a contrast and then a focusing is performed by utilizing the correlation that a contrast of an image becomes at the maximum when the image is sharply formed. A size of a contrast can be evaluated by a size of a high-frequency component of an imaging signal. That is, a high-frequency component of an imaging signal is extracted by BPF 1124 and let what an absolute value of a high-frequency component is integrated at evaluation value calculation unit 1125 be focus evaluation value. This focus evaluation value is amount varying in response to a contrast of an image, in other words, a status of a focus adjustment of a focus lens and it becomes at the maximum value (peak value) when an object comes to focus and a contrast becomes at the maximum.

To look for a lens position with a peak value of focus evaluation value, this embodiment employs a so-called full range scan. As shown in FIG. 2(*a*), for example, this scan method drives a focus lens from infinity point to a closest distance point in a single direction and during a scan driving, the foregoing focus evaluation values are obtained and then an obtained each value is stored every time a focus lens moves by a given movement pitch. The marks ○ and x denote a point to seek focus evaluation value. After a scan driving, a peak position will be obtained by analysis of a plurality of stored focus evaluation values and it will be acknowledged as an in-focus position. A scanning may start from a closest distance point to infinity point.

Well, when it comes to a detection of a peak position, by making a movement pitch of a focus lens small, the finer a scanning is, the more accurate detection of a peak position becomes. However, even when a movement pitch is relatively large, a peak position can be detected with relative high accuracy if sufficient focus evaluation data in the vicinity of a peak position are available. What matters is a case where there is no sufficient data either before or after a peak position.

FIG. 2, for example, shows an example that a peak of focus evaluation value is close to infinity point where a scan starts. In this case, when a movement pitch is large as illustrated by P2 of FIG. 2, since sufficient data covering from a peak position to infinity point is not available, it becomes difficult to obtain a peak position with high accuracy. Also, similarly when a peak position is adjacent to a closest distance point where a scan finishes, as data covering from a peak position to a closest distance point is not sufficient, a peak position cannot be accurately detected. Thus, in accordance with this embodiment, movement pitches P1 (<P2) (spacing between ○) of range E1 nearby infinity point and range E3 close to a closest distance point are made relatively small. With this pitch arrangement, a fine scanning can be performed due to a small movement pitch in ranges E1 and E3. And even when a peak position is nearby infinity point or a closest distance point, as sufficient data in front of and at the back of a peak position can be obtained, a peak position can be detected with high accuracy. On the other hand, middle range E2 occupying the space in between ranges E1 and E3 is provided with relatively large movement pitch P2 (spacing between x). In a case of a peak position being in this range, a peak position may be detected with relatively good accuracy as sufficient data in front of and at the back of a peak value is available, although a scanning becomes rough thanks to a large movement pitch. Accordingly, this embodiment does not make a movement pitch small throughout a focus detection area, but makes it small only at a necessary portion. Thus, no matter where a peak position is, a peak position (in-focus position) can be detected accurately without significantly slowing down a scanning. Namely, this embodiment enables an AF operation to become compatible with high accuracy and high speed. Particularly, it enables a scanning speed in ranges E1 and E3 to become faster as even a total of small movement pitches of E1 and E3 is still narrow in comparison to a large movement pitch of range E2.

FIG. 3 is a flow chart showing a control procedure of CPU 112 to realize the foregoing operation. In step S1, when AF start switch (ex. a halfway-depress switch) is turned on, a focus lens moves up to either infinity end or a closest distance end in step S2. This end becomes a scanning start point and it is assumed that it is infinity point herein. And then, until a lens reaches the another end (a closest distance end) in step S9, a processing is repeatedly performed from steps S3 to S8. In step S3, of imaging signals output by imaging element 103, a high-frequency component of the signal coming out of focus detection area is extracted by BPF 1124 and focus evaluation value is obtained by integrating absolute value of a high-frequency component at evaluation value calculation unit 1125. Focus evaluation value is stored into storage unit 1128 of CPU 112. In step S4, a present lens position detected from an output of lens position detection unit 150 is stored into storage unit 1128 just like focus evaluation value. In step S5, which range a lens position belongs to E1, E2 or E3 is judged. When it belongs to range E1 or E3, let a movement pitch be P1 in step S6 and when it is included in range E2, let a movement pitch be P2 (>P1) in step S7. Well then, in step S8, a focus lens moves towards a closest distance end by P and then a flow proceeds to S9.

In the foregoing step S8, whether a focus lens moves by P may be judged by counting a pulse of, for instance, a stepping motor for focusing and when counted pulses amount to a given number, it may be concluded that the focus lens moves by P. When P=P1, a given number of pulses may be less than that of P=P2. Or let a given number of pulses be fixed, the similar operation may be realized by making a moving speed of a focus lens in ranges E1 and E3 lower than in range E2.

In step S9, when it is judged that a focus lens reaches a closest distance end, a scanning finishes and in step S10, AF calculation is performed by AF calculation unit 1126. In step S11, it is judged whether or not a peak is detected by AF calculation and when a peak is detected, a focus lens is driven to a peak position. Or, when a peak is not detected, as detection becomes impossible, in step S13, a focus lens is driven to a predetermined given position.

In the meantime, a fluctuating curve of focus evaluation value in response to a lens position varies with depth of field. In a case where depth of field is shallow, as a curve becomes sharp, a fine scanning is required to get a peak position accurately compared to a case where a curve is gentle. And when a focal length of a lens that is one of factors determining depth of field is paid attention to, it is conceivable that the longer a focal length (depth of field is shallow) is, the smaller lens movement pitches P1 and P2 are made. In a case of a zoom lens, for instance, a movement pitch may be variable coupling with a zooming. And in a case of a camera with an interchangeable lens, a movement pitch may be changeable in response to a focal length of a loaded lens.

Further, f-number (maximum aperture) has an effect on depth of field. Generally, as an imaging signal for use in AF is picked up at the maximum aperture, when looking at f-number maximum aperture of an imaging optical system, it is conceivable that the larger the f-number (a slow lens) is, the larger movement pitches P1 and P2 are made. This is attributable to a correlation that the larger the f-number is, the greater depth of field gets.

Even if movement pitches P1 and P2 may vary with a focal length or f-number as in the foregoing, a relation of P1<P2 is always maintained. As shown in FIG. 2(*b*), however, width of ranges E1 and E3 may be changed subject to a focal length or f-number. For instance, the longer a focal length is, the narrower ranges E1 and E3 each may be made towards infinity point and a closest distance point respectively and the broader middle range E2 may be made. That is, when a focal length is long, as a movement pitch becomes narrow throughout an overall range, highly accurate peak detection becomes possible even if, among them ranges E1 and E3 with narrow movement pitches get further narrowed. And with narrowed ranges E1 and E3, a high speed scanning can be also realized. Also, the larger f-number is, the broader the movement pitches of ranges E1 and E3 may be made. The reason is that when f-number is large, as movement pitch becomes broader throughout an overall range, accuracy for detecting a peak position decreases unless movement pitches of ranges E1 and E3 are made broader.

CPU 112 of the foregoing embodiment constitutes a calculator, a pitch determiner and a controller, and CPU 112 and driver 113 each constitutes a scan driving and a focusing adjuster, and lens position detector 150 constitutes a detector.

According to FIGS. 4 and 5, a second embodiment of this invention will be explained. The foregoing has introduced the example that the lens movement pitches nearby infinity point and a closest distance point are made small. However, a second embodiment describes another example that in response to a shooting mode, a range of making a movement pitch small is changed. Anyway, it is assumed that a configuration of a control system is the same as that of the foregoing embodiment (FIG. 1).

As described in the foregoing, there are several shooting modes and of them, a scenic and night scenery modes are for shooting an object at a relatively long distance away and they are called a long distance shooting mode. When a scanning across an overall range is performed in a long distance mode, only a long distant area where a major object is most likely to exist may be scanned very finely and on the contrary, a relative close distant area where a possibility of presence of an object is low may be done roughly.

In the meanwhile, a portrait mode and close-up modes are for photographing an object at a relatively close distance away and they are called a close distance shooting mode. When a scanning across an overall range is performed in a close distance mode, only a close distant area where a major object is most likely to exist may be scanned very finely and a relative long distant area where a possibility of presence of an object is low may be done roughly.

Figure 4:
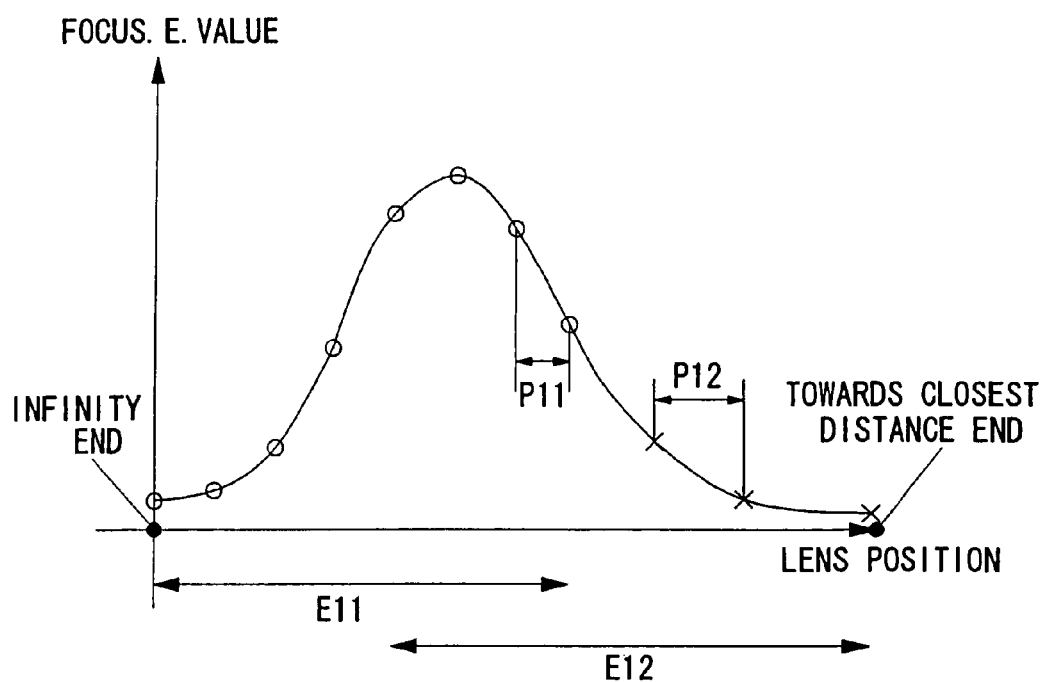
FIG. 4 is a diagram explaining a scanning control in a second embodiment.
Figure 5:
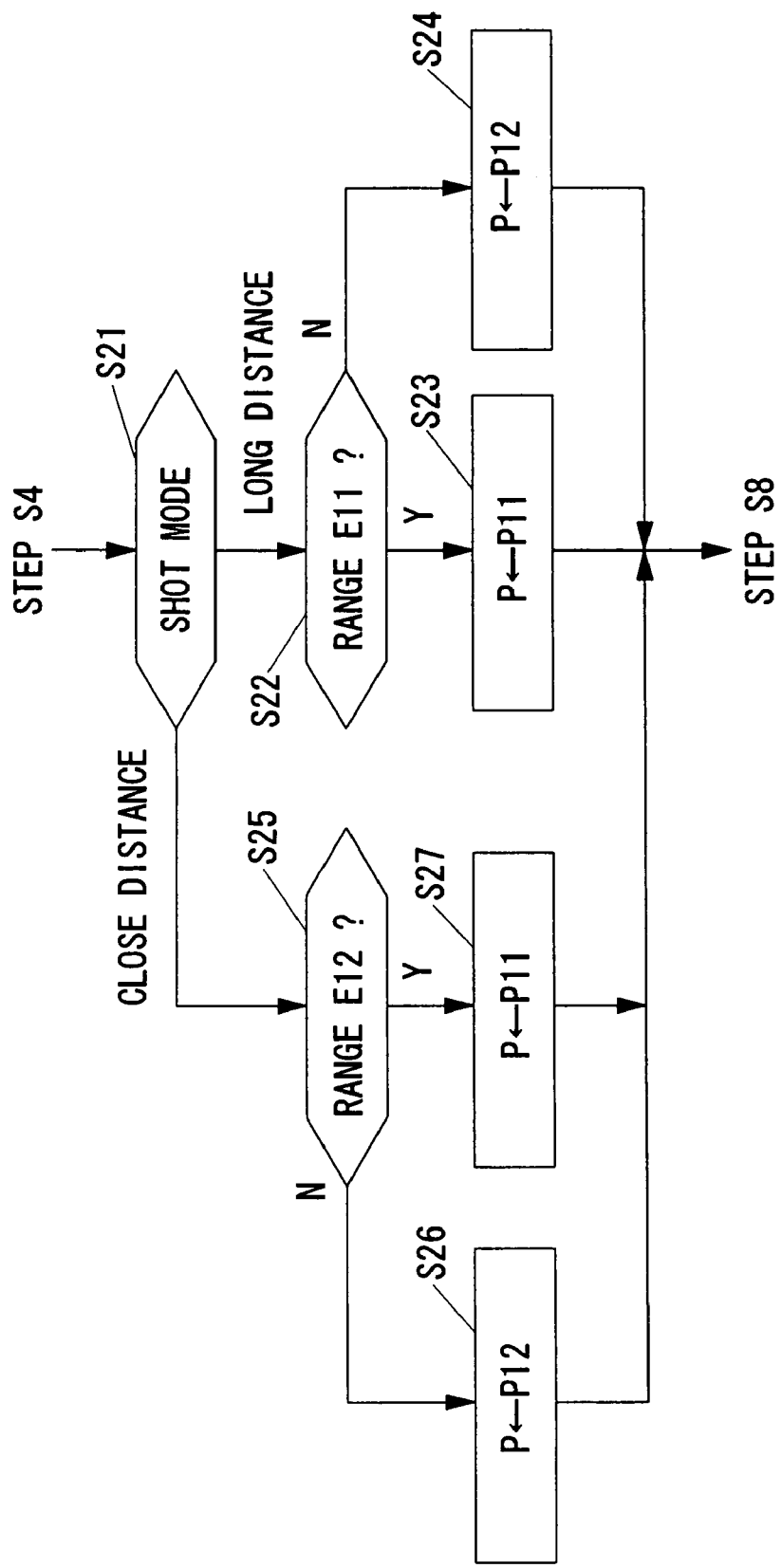
FIG. 5 is a flow chart illustrating an example a scanning control in FIG. 4.

In accordance with this invention, when a long distance mode is set, as shown in FIG. 4, range E11 covering from infinity point to a point falling short of a closest distant point is provided with relative small movement pitch P11 and a range from the point falling short of a closest distant point to a closest distance end is provided with large movement pitch P12 (>P11). When a close distance mode is set, range E12 covering from a closest distant point to a point falling short of infinity point is provided with movement pitch P11 and a range covering from the point falling short of infinity point to infinity point is provided with movement pitch P12. For realizing the foregoing control, steps S5~S7 of FIG. 3 may be replaced with steps S21~S27 of FIG. 5. Specifically, when a lens position is detected in step S4 of FIG. 3, a flow proceeds to S21 of FIG. 5 and then a current shooting mode in use is judged. If a shooting mode is in a long distance, a flow proceeds to step S22 and which range includes a lens position is judged from an output of lens position detection unit 150. When a lens position belongs to range E11, in step S23, movement pitch P is P11 and when it does not belong to range E11, in step S24, movement pitch P is P12 (>P11).

In step S21, when a shooting mode is judged to be a close distance mode, it is judged in step S25 which range includes a current lens position. If range E12 does, in step S26, movement pitch P is P11 and when a current lens position is not in range E12, in step S27, movement pitch P is P12. Then, a flow proceeds to step S8 of FIG. 3.

Also in this embodiment just like the first embodiment, a movement pitch of only a necessary portion is made small and a movement pitch of another portion is made large. Therefore, this embodiment enables a high accuracy and a high speed to be compatible with an AF operation.

Now, a way of setting a movement pitch in response to a lens position can be determined with several conditions other than the foregoing. In some instances, contrary to the first embodiment, the movement pitches adjacent to infinity and closest points may be made large. Also, this embodiment employs two-size settable movement pitches, small and large, but a plurality of sizes in pitch such as large, middle and small depending upon a lens position may be enabled to be set.

Further, this invention has introduced an example about a scanning across an overall movement range of a focus lens as in the foregoing, but only a predetermined specific part in a movement range of a focus lens may be scanned. For example, when scanning from infinity point or a closest one to a given middle point, or from a middle point to another middle point, this invention is also applicable. This invention has referred to a digital still camera, but may go for another camera using a silver halide film. In this case, an imaging element used for AF is required.

What is claimed is:

1. A camera comprising:
    an imaging element that receives transmitted light of an imaging optical system including a focus lens;
    a calculator that calculates a focus evaluation value varying in response to a status of a focusing adjustment of the focus lens based upon an output of photoelectric conversion of the imaging element;
    a scan-driver that scans the focus lens along an optical axis in obtaining a focus point;
    a pitch determiner that determines a lens movement pitch for obtaining the focus evaluation value during a scan driving of the scan-driver, depending on whether or not a lens position of the focus lens is within a predetermined range before the scan driving;
    a controller that obtains the focus evaluation value by activating the calculator every time the focus lens moves by the determined lens movement pitch during the scan driving; and
    a focusing adjuster that seeks a focus point by evaluating a plurality of focus evaluation values obtained by the controller and drives the focus lens to the focus point.

2. The camera set forth in claim 1, wherein,
    in a case of the lens position being included in the predetermined range, the pitch determiner makes the movement pitch small as compared to a case of the lens position being included in another range other than the predetermined range.

3. The camera set forth in claim 2, wherein
    the predetermined range is narrow in comparison to another range other than the predetermined range.

4. The camera set forth in claim 2, wherein
    the predetermined range is adjacent to a start or a finish point of the scan driving.

5. The camera set forth in claim 2, wherein
    the pitch determiner determines the movement pitch in response to the lens position and a focal length of the imaging optical system and the longer the focal length is, the smaller the movement pitch is made. 6. The camera set forth in claim 5, wherein the longer the focal length is, the narrower the predetermined range is made.

7. The camera set forth in claim 2, wherein the pitch determiner determines the movement pitch in response to the lens position and f-number of the imaging optical system and the greater the f-number is, the larger the movement pitch is made.

8. The camera set forth in claim 7, wherein the greater the f-number is, the broader the predetermined range is made.

9. The camera set forth in claim 1, wherein, in a case of the detected lens position being included in the predetermined range, the pitch determiner makes the movement pitch large as compared to the case of the lens position being included in another range other than the predetermined range.

10. The camera set forth in claim 1, wherein the scan-driver scans the focus lens from either an infinity end or a closest distance end to the other end.

11. The camera as set forth in claim 1, the pitch determiner determining an adjustable lens movement pitch.

12. A camera comprising:
an imaging element that receives transmitted light of an imaging optical system including a focus lens;
a calculator that calculates a focus evaluation value varying in response to a status of a focusing adjustment of the focus lens based upon an output of photoelectric conversion of the imaging element;
a scan-driver that scans the focus lens along an optical axis in obtaining a focus point;
a pitch determiner that determines a lens movement pitch at the time of obtaining the focus evaluation value, the lens movement pitch being predetermined according to a lens position of the focus lens during a scan driving of the scan-driver;
a controller that obtains the focus evaluation value by activating the calculator every time the focus lens moves by the determined lens movement pitch during the scan driving; and
a focusing adjuster that seeks a focus point by evaluating a plurality of focus evaluation values obtained by the controller and drives the focus lens to the focus point, wherein
close and long distance shooting modes are settable,
in the close distance shooting mode, in a case of the lens position being included in a given range at a close distance away, the pitch determiner makes the movement pitch small as compared to a case of the lens position being included in another range other than the given range at a close distance away, and
in the long distance shooting mode, in a case of the lens position being included in the given range at a long distance away, the pitch determiner makes the movement pitch small as compared to a case of the lens position being included in another range other than the given range at a long distance away.

13. The camera set forth in claim 12, wherein the close distance mode includes portrait and close-up shooting modes and the long distance mode includes scenic and night scenery shooting modes.

14. A camera comprising:
an imaging element that receives transmitted light of an imaging optical system including a focus lens;
a calculator that calculates a focus evaluation value varying in response to a status of a focusing adjustment of the focus lens based upon an output of photoelectric conversion of the imaging element;
a scan-driver that scans the focus lens along an optical axis in obtaining a focus point;
a judgment unit that judges, during a scan driving of the scan-driver, whether or not a lens position of the focus lens is from a predetermined position before the scan driving to infinity point;
a pitch determiner that determines a lens movement pitch for obtaining the focus evaluation value, in case the judgment unit judges the lens position is from the predetermined position to the infinity point, so as to be smaller than the lens movement pitch in case of the lens position being at the predetermined position;
a controller that obtains the focus evaluation value by activating the calculator every time the focus lens moves by the determined lens movement pitch during the scan driving; and
a focusing adjuster that seeks a focus point by evaluating a plurality of focus evaluation values obtained by the controller and drives the focus lens to the focus point.

15. A camera comprising:
an imaging element that receives transmitted light of an imaging optical system including a focus lens;
a calculator that calculates a focus evaluation value varying in response to a status of a focusing adjustment of the focus lens based upon an output of photoelectric conversion of the imaging element;
a scan-driver that scans the focus lens along an optical axis in obtaining a focus point;
a judgment unit that judges, during a scan driving of the scan-driver, whether or not a lens position of the focus lens is from a predetermined position before the scan driving to a closest distance point;
a pitch determiner that determines a lens movement pitch for obtaining the focus evaluation value, in case the judgment unit judges the lens position is from the predetermined position to the closest distance point, so as to be smaller than the lens movement pitch in case of the lens position being at the predetermined position;
a controller that obtains the focus evaluation value by activating the calculator every time the focus lens moves by the determined lens movement pitch during the scan driving; and
a focusing adjuster that seeks a focus point by evaluating a plurality of focus evaluation values obtained by the controller and drives the focus lens to the focus point.

16. A camera comprising:
an imaging element that receives transmitted light of an imaging optical system including a focus lens;
a calculator that calculates a focus evaluation value varying in response to a status of a focusing adjustment of the focus lens based upon an output of photoelectric conversion of the imaging element;
a scan-driver that scans the focus lens along an optical axis in obtaining a focus point;
a pitch determiner that determines a lens movement pitch, in case a focal length is longer than a predetermined length before a scan driving of the scan-driver, so as to be smaller than the lens movement pitch in case of the focal length being the predetermined length;
a controller that obtains the focus evaluation value by activating the calculator every time the focus lens moves by the determined lens movement pitch during the scan driving; and a focusing adjuster that seeks a focus point by evaluating a plurality of focus evaluation values obtained by the controller and drives the focus lens to the focus point.

17. A camera comprising:

an imaging element that receives transmitted light of an imaging optical system including a focus lens;

a calculator that calculates a focus evaluation value varying in response to a status of a focusing adjustment of the focus lens based upon an output of photoelectric conversion of the imaging element;

a scan-driver that scans the focus lens along an optical axis in obtaining a focus point;

a pitch determiner that determines a lens movement pitch, in case an f-number for maximum aperture of the imaging optical system is smaller than a predetermined value before a scan driving of the scan-driver, so as to be smaller than the lens movement pitch in case of the f-number for maximum aperture being the predetermined value;

a controller that obtains the focus evaluation value by activating the calculator every time the focus lens moves by the determined lens movement pitch during the scan driving; and a focusing adjuster that seeks a focus point by evaluating a plurality of focus evaluation values obtained by the controller and drives the focus lens to the focus point.

18. A camera comprising:

an imaging element that receives transmitted light of an imaging optical system including a focus lens;

a calculator that calculates a focus evaluation value varying in response to a status of a focusing adjustment of the focus lens based upon an output of photoelectric conversion of the imaging element;

a scan-driver that scans the focus lens along an optical axis in obtaining a focus point;

a pitch determiner that determines a first lens movement pitch for obtaining the focus evaluation value during a scan driving of the scan-driver, in case a lens position of the focus lens is within a first predetermined range before the scan driving, and that determines a second lens movement pitch for obtaining the focus evaluation value larger than the first lens movement pitch during the scan driving, in case the lens position is within a second predetermined range different from the first predetermined range before the scan driving;

a controller that obtains the focus evaluation value by activating the calculator every time the focus lens moves by the determined lens movement pitch during the scan driving; and a focusing adjuster that seeks a focus point by evaluating a plurality of focus evaluation values obtained by the controller and drives the focus lens to the focus point, wherein the first predetermined range is narrower than the second predetermined range.

* * * * *